United States Patent Office 3,480,658
Patented Nov. 25, 1969

3,480,658
3,5-DIHALO-4-CARBAMATO BENZONITRILES
Otto Rohr, Neu-Allschwil, Switzerland, assignor to Ciba Limited, a company of Switzerland
No Drawing. Filed Aug. 31, 1966, Ser. No. 576,231
Claims priority, application Switzerland, Sept. 24, 1965, 13,276/65
Int. Cl. C07c 121/52; A01n 9/20
U.S. Cl. 260—465         4 Claims

ABSTRACT OF THE DISCLOSURE

Compounds are provided which are represented by the formula

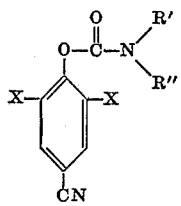

in which X represents halogen, R' hydrogen or alkyl, and R" alkyl, lower chloroalkyl, phenyl, and phenyl substituted with —$NO_2$ halogen, —$CF_3$ or alkyl. The compounds of this invention are especially useful as herbicides and pesticides.

---

The present invention relates to new compounds having pesticidal activity, and preparations containing them.

Belgian Patent No. 643,065 granted July 28, 1964 to Ciba Societe Anonyme, Basel, Switzerland describes the insecticidal, herbicidal and microbicidal effects of compounds of the general formula

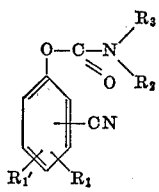

in which $R_1$ and $R_1'$ are identical or different and each represents a hydrogen atom, a halogen atom, preferably a chlorine atom, an alkoxy radical containing 1 to 4 carbon atoms or the group —$NO_2$; $R_2$ represents a hydrogen atom or an alkyl radical containing 1 to 4 carbon atoms and $R_3$ represents an alkyl radical containing 1 to 4 carbon atoms.

The present invention provides compounds of the general formula

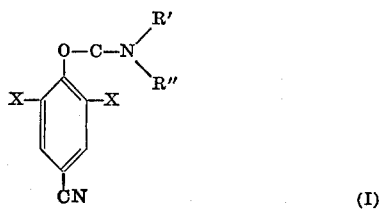

in which X represents a halogen atom, R' a hydrogen atom or an alkyl radical containing 1 to 4 carbon atoms and R" an alkyl radical containing up to 12 carbon atoms, a lower chloroalkyl radical or a phenyl radical which may be unsubstituted or carry as substituents —$NO_2$, halogen or —$CF_3$ groups or an alkyl radical containing 1 to 4 carbon atoms.

The present invention also provides pesticidal preparations which contain, as active ingredient, a compound of the above general Formula I and, if desired, one or more than one of the following additives: a solvent, a diluent, a dispersant, a wetting agent, an adhesive and/or other pesticides. The compounds of the above general Formula I display a herbicidal effect that is far superior to that of the compounds described in Belgian specification No. 643,065. Especially effective are those preparations which contain, as active ingredient, a compound of the general Formula I in which X represents iodine.

The new preparations are especially suitable as total and selective weedkillers, as defoliants, for example in cotton cultures, and also for combating molluscs. The compounds of the formulae

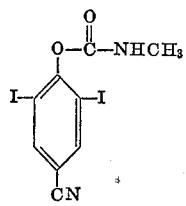

and

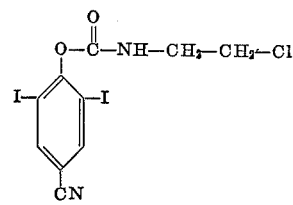

are especially active as herbicides.

The new compounds of the general Formula I can be prepared by known methods, for example by those disclosed in Belgian specification No. 643,065.

As mentioned above, the new preparations may contain in addition to the new active compounds of the general Formula I various further ingredients. This enables the new active substances to be used in a variety of ways which are dealt with in greater detail below:

Sprayable solutions for direct application contain, for example, petroleum fractions within the high to medium boiling range, especially those boiling above 100° C., for example diesel oil or kerosene, also coal tar oils or oils of vegetable or animal origin, as well as hydrocarbons for example, alkylated naphthalenes, tetrahydronaphthalene, xylene mixtures, cyclohexanols and, if desired, furthermore ketones, chlorinated hydrocarbons for example tetrachloroethane, trichloroethylene or tri- or tetrachlorobenzenes.

In aqueous forms of application, there are used emulsion concentrates, pastes or wettable spray powders with addition of water. As emulsifiers or dispersants, there are suitable nonionic products, for example condensation products of aliphatic alcohols, amines or carboxylic acids having a long-chain hydrocarbon residue containing about 10 to 30 carbon atoms, with ethylene oxide, for example the condensation product of octadecyl alcohol with 25 to 30 mols of ethylene oxide, or of soybean fatty acid with 30 mols of ethylene oxide, or of commercial oleylamine with 15 mols of ethylene oxide, or of dodecylmercaptan with 12 mols of ethylene oxide. Likewise suitable are condensation products of ethylene oxide with hydroaromatic polycyclic carboxylic acids or amines. From among suitable anionic emulsifiers there may be mentioned: the sodium salt of dodecyl alcohol sulphuric acid ester, the sodium salt of dodecyl-benzene-sulphonic acid, the potassium or triethanolamine salt of oleic or abietic acid or of mixtures of these acids, or the sodium salt of a petroleum-sulphonic acid. Suitable cationic dispersants are quaternary ammonium and phosphonium compounds, for example cetyl pyridinium chloride or dihydroxyethyl benzyl dodecyl ammonium chloride.

When the new preparations are to be used in the form of dusting or casting preparations, they may contain as solid vehicles: talcum, kaolin, bentonite, sand, calcium carbonate, calcium phosphate, or coal, cork meal or wood meal and other materials of vegetable origin. As is usual, the various preparations may contain substances that facilitate the distribution, adhesion or penetration, for example fatty acids, resins, glue, casein or, for example, alginates. It is also very advantageous to use the preparations in granulated form. The new compounds may be the only ingredient of the pesticidal preparation or they may be applied in combination with other insecticides, acaricides, nematocides, molluscicides, herbicides, or fungicides. Such preparations are used in plant protection and in hygiene by the usual spraying, pouring, dusting or fumigating methods.

The compounds of the general Formula I further possess microbicidal, especially fungicidal and bactericidal as well as acaricidal, nematocidal, molluscicidal and insecticidal properties.

The following examples illustrate the invention, the parts and percentages being by weight, unless otherwise mentioned.

EXAMPLE 1

(1) A solution of 18.5 parts of 4-cyano-2,6-diiodophenol and 0.1 part of triethylene-diamine in 100 parts by volume of dioxan is mixed dropwise at a temperature within the range of from 10° to 20° C. with a solution of 4 parts of methylisocyanate in 10 parts by volume of dioxan and the whole is stirred overnight at a temperature of 20° to 25° C. The precipitated reaction product is filtered off and recrystallized from acetone+benzene, to yield the compound of the formula

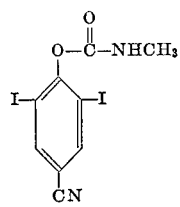

melting at 178° to 180° C.

(2) In the same manner as described under (1) the following compounds are obtained:

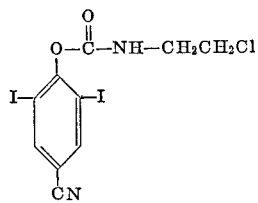

melting at 185° to 187° C.

(3)

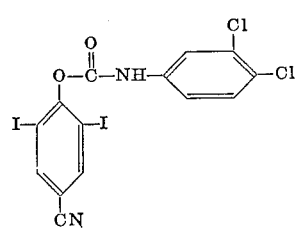

M.P. 180–181°.

(4)

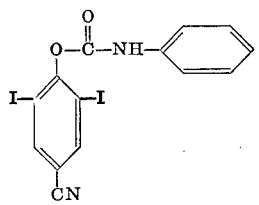

M.P. 186°–188°.

(5)

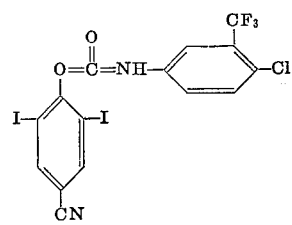

M.P. 157°–163°.

(6)

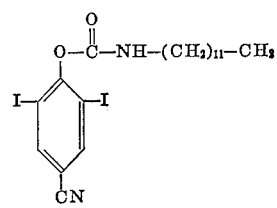

M.P. 144°–145°.

(7)

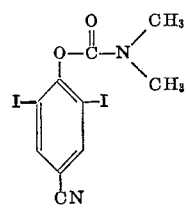

M.P. 178°–182°.

(8)

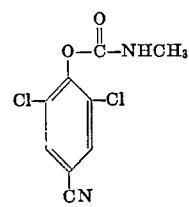

M.P. 146°–147°.

(9)

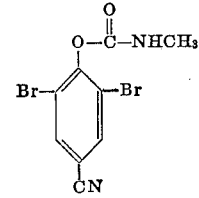

M.P. 162°–166°.

(10)

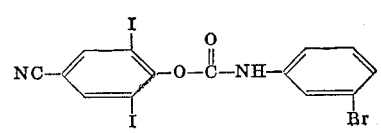

M.P. 172°–174°.

(11)

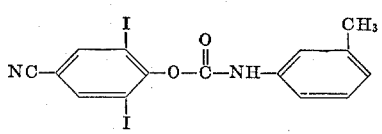

M.P. 157°–158°.

(12)

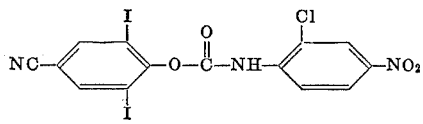

M.P. 175°–176°.

(13)

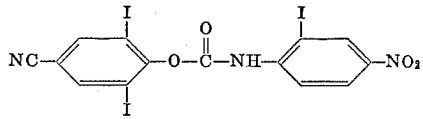

M.P. 176°–179°.

(14)

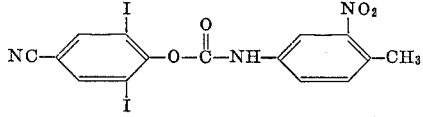

M.P. 176°–180°.

EXAMPLE 2

A spray powder was prepared from the following ingredients:

50% of one of the active substances described in Example 1 under 1 to 6
25% of bolus alba (kaolin)
20% of finely dispersed silica (marketed under the trade name "Hisil")
3.5% of a condensation product from 1 mol of dodecylmercaptan and 12 mols of ethylene oxide
1.5% of a condensation product of para-nonylphenol and 9 mols of ethylene oxide.

The resulting, finely ground mixture can be diluted with water in any desired proportion to form a spray broth ready for use.

EXAMPLE 3

The following types of plants were planted in pots in a greenhouse: Wheat, barley, oats, Panicum, sugarbeet, marigold, flax, rape, carrots and salad. These plants were treated with a spray broth, prepared as described in Example 2, containing as active ingredient 1.0 and 0.5 kg. respectively per hectare of compounds 1 and 3 of Example 1, and 1.0 and 2.0 kg. respectively of compounds 2 and 4 of Example 1, per hectare. The results are summarized in the following table:

| Compound of Example 1, in kg./hectare | No. 1 | | No. 3 | | No. 2 | | No. 4 | |
|---|---|---|---|---|---|---|---|---|
| | 1.0 | 0.5 | 1.0 | 0.5 | 1.0 | 2.0 | 1.0 | 2.0 |
| Wheat | 0 | 0 | 0 | 0 | 0 | 0 | 0 | 0 |
| Barley | 1 | 0 | 0 | 0 | 0 | 0 | 0 | 0 |
| Oats | 0 | 0 | 0 | 0 | 0 | 0 | 0 | 0 |
| Panicum | 10 | 4 | 6 | 4 | 3 | 5 | 4 | 5 |
| Sugarbeet | 10 | 10 | 10 | 10 | 10 | 10 | 10 | 10 |
| Marigold | 10 | 10 | 10 | 10 | 10 | 10 | 10 | 10 |
| Flax | 10 | 10 | 10 | 10 | 10 | 10 | 10 | 10 |
| Rape | 10 | 10 | 10 | 10 | 10 | 10 | 10 | 10 |
| Carrots | 10 | 10 | 10 | 10 | 10 | 10 | 10 | 10 |
| Salad | 10 | 10 | 10 | 10 | 10 | 10 | 10 | 10 |

0=no effect upon plants, 10=plants completely destroyed.

A similar effect was achieved with the compounds 5 and 6 described in Example 1.

What is claimed is:
1. A compound of the formula

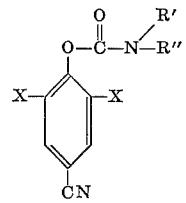

in which both substituents X are identical and are selected from the group consisting of chlorine, bromine and iodine, R' represents a member selected from the group consisting of hydrogen and lower alkyl having 1–4 carbon atoms, R" represents a member selected from the group consisting of (a) an alkyl radical containing up to 12 carbon atoms, (b) lower monochloroalkyl, (c) phenyl and (d) a phenyl radical substituted by 1 or 2 members selected from the group consisting of chlorine, bromine, iodine, lower alkyl, —$CF_3$ and —$NO_2$.

2. A compound as claimed in claim 1 wherein X represents iodine.

3. A compound as claimed in claim 1 wherein X represents iodine, R' represents hydrogen and R" represents methyl.

4. A compound as claimed in claim 1 wherein X represents iodine, R' represents hydrogen and R" represents chloroethyl.

References Cited

UNITED STATES PATENTS 2,863,754   12/1958   Wain _____ 71—105
3,304,225   2/1967   Szabo et al. _____ 260—465 X
3,329,702   7/1967   Rohr _____ 260—465

FOREIGN PATENTS 643,065   7/1964   Belgium.

CHARLES B. PARKER, Primary Examiner
S. T. LAWRENCE III, Assistant Examiner

U.S. Cl. X.R.

71—3, 70, 105; 260—999; 424—304